US007858938B2

(12) United States Patent
Daly et al.

(10) Patent No.: US 7,858,938 B2
(45) Date of Patent: Dec. 28, 2010

(54) SYSTEM FOR DEPLOYMENT OF A MILLIMETER WAVE CONCEALED OBJECT DETECTION SYSTEM USING AN OUTDOOR PASSIVELY ILLUMINATED STRUCTURE

(75) Inventors: Robert Patrick Daly, Orlando, FL (US); Willem H. Reinpoldt, Windermere, FL (US)

(73) Assignee: Brijot Imaging Systems, Inc., Lake Mary, FL (US)

( * ) Notice: Subject to any disclaimer, the term of this patent is extended or adjusted under 35 U.S.C. 154(b) by 359 days.

(21) Appl. No.: 12/135,698

(22) Filed: Jun. 9, 2008

(65) Prior Publication Data

US 2009/0140908 A1    Jun. 4, 2009

Related U.S. Application Data

(60) Provisional application No. 60/942,480, filed on Jun. 7, 2007.

(51) Int. Cl.
*G01J 1/00* (2006.01)
*G01J 5/02* (2006.01)
*A47F 10/00* (2006.01)
*E04H 3/00* (2006.01)
*E06B 7/00* (2006.01)
*E04H 14/00* (2006.01)
*G08B 21/00* (2006.01)

(52) U.S. Cl. .................. 250/336.1; 250/341.1; 52/36.1; 52/79.5; 52/79.7; 52/79.8; 52/473; 52/171.1; 52/171.3; 52/173.3; 340/540

(58) Field of Classification Search .............. 250/336.1, 250/341.1; 52/36.1, 79.5, 79.7, 79.8, 473, 52/171.1, 171.3, 173.3; 340/540
See application file for complete search history.

(56) References Cited

U.S. PATENT DOCUMENTS

| | | | | |
|---|---|---|---|---|
| 5,927,026 A | * | 7/1999 | Durham | 52/173.3 |
| 6,417,502 B1 | * | 7/2002 | Stoner et al. | 250/208.1 |
| 6,484,650 B1 | * | 11/2002 | Stomski | 109/6 |
| 7,023,339 B2 | * | 4/2006 | Stomski | 340/540 |
| 2003/0085348 A1 | * | 5/2003 | Megerle | 250/287 |
| 2003/0213188 A1 | * | 11/2003 | Bigelow | 52/174 |
| 2005/0249382 A1 | * | 11/2005 | Schwab et al. | 382/115 |

* cited by examiner

*Primary Examiner*—David P Porta
*Assistant Examiner*—Mindy Vu
(74) *Attorney, Agent, or Firm*—ShuffieldLowman; Matthew G. McKinney

(57) ABSTRACT

A system for deployment of a millimeter wave concealed object detection system using an outdoor passively illuminated structure is disclosed. In a particular embodiment, the structure includes at least one sidewall with at least one louvered panel within the sidewall. The louvered panel is orientated to reflect millimeter energy into the structure that is used in part by a concealed object detection system for detecting concealed objects. The louvered panel includes a plurality of adjustable parallel slats for obtaining an optimum deployment angle. The structure further includes at least one detection lane for guiding a subject through the structure and is configured between a controlled entry barrier and an exit barrier of the structure.

19 Claims, 2 Drawing Sheets

Figure 1:
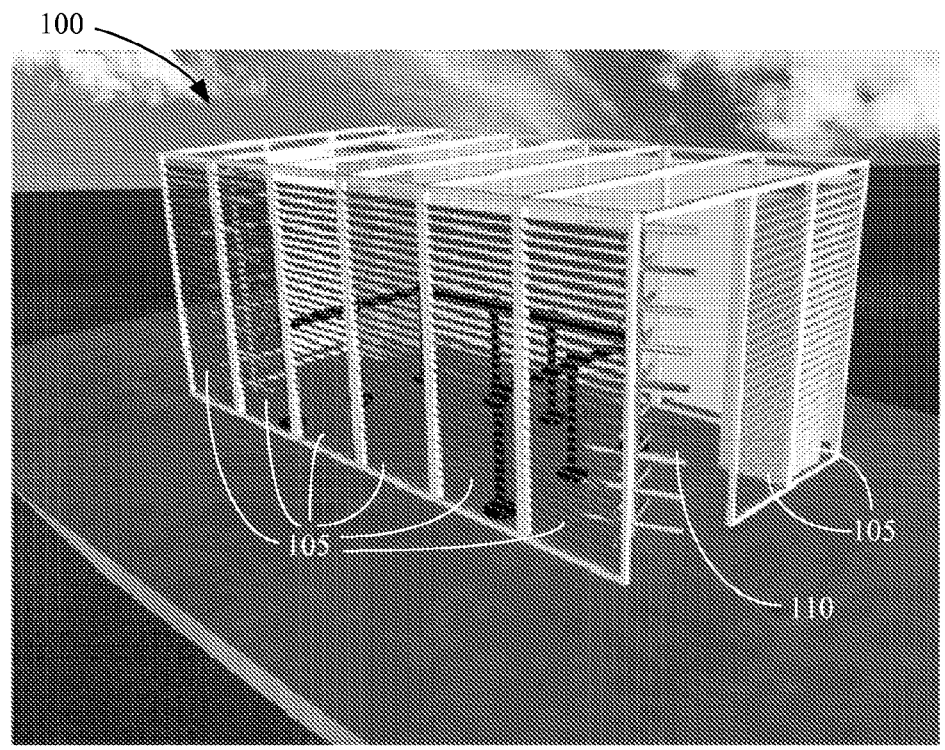

SYSTEM FOR DEPLOYMENT OF A MILLIMETER WAVE CONCEALED OBJECT DETECTION SYSTEM USING AN OUTDOOR PASSIVELY ILLUMINATED STRUCTURE

I. CROSS REFERENCE TO RELATED APPLICATIONS

This application claims the benefit of U.S. Provisional Application No. 60/942,480 filed Jun. 7, 2007. The disclosure of the provisional application is incorporated herein by reference. In addition, this application relates to the subject matter of U.S. Provisional Patent Application No. 60/917,414 filed May 11, 2007, and U.S. Provisional Patent Application No. 60/914,332 filed Apr. 27, 2007, the entire disclosures of which are incorporated herein by reference.

II. FIELD

The present disclosure relates generally to the field of deployment systems, and in particular to a system for deployment of a millimeter wave concealed object detection system using an outdoor passively illuminated structure.

III. DESCRIPTION OF RELATED ART

Security systems can be found at airports, train stations, arenas, construction sites, and other public, private, commercial and industrial facilities. In addition, security systems are used in field military operations to secure boundaries. One of the principal concerns of operators of security systems is the need to protect security personnel and innocent bystanders in the course of conducting a search of a person for concealed objects. The concealed objects that present a danger are weapons, explosives, contraband and other similar items that may endanger security personnel and other individuals in the proximity.

Typical metal or chemical residue detectors require security personnel to be in the proximity of the individual. For example, one or more security personnel are required to conduct a hands-on or "wand-based" scan of an individual for whom the metal or chemical residue detector has generated an alarm. An inherent deficiency of this type of security system is the fact that it exposes not only the security personnel to danger, but also other individuals in the vicinity of the security system to the dangers posed by such concealed objects. Passive millimeter wave concealed object detection systems have been developed that allow for a buffer zone between the individual and innocent bystanders. However, there is still a concern that when a concealed object is detected on a person, that the person may attempt to escape the area or injure others in the proximity using an explosive device (i.e., suicide bomber). Accordingly, there is a need in the relevant art for a system for deployment of a millimeter wave concealed object detection system that has the ability to protect security personnel and innocent by-standers from any potential threat or danger from a concealed object.

In addition, the conditions under which a millimeter wave concealed object detection system operates has a significant impact on the efficacy of the detection system. Accordingly, another need exists in the art for a system for deployment of a millimeter wave concealed object detection system that uses pre-engineered and pre-fabricated design solutions towards providing a controlled environment in which the concealed object detection camera(s) can operate.

Another need exists in the art for a system for deployment of a millimeter wave concealed object detection system that uses an outdoor passively illuminated structure to optimize the performance of the detection system.

Another need exists in the art for a system for deployment of a millimeter wave concealed object detection system using that does not require an artificial energy source (e.g., electricity).

Another need exists in the art for a system for deployment of a millimeter wave concealed object detection system that does not radiate any radiation or energy itself but uses the naturally occurring millimeter wave energy from the sky.

Another need exists in the art for a system for deployment of a millimeter wave concealed object detection system that uses an external structure to serve as an access control point to a parent structure.

Another need exists in the art for a system for deployment of a millimeter wave concealed object detection system that has the capability to operate as either an entry portal for weapons detection or as an exit portal for theft prevention or both.

Another need exists in the art for a system for deployment of a millimeter wave concealed object detection system that is adjustable depending on the particular environment and application.

Another need exists in the art for a system for deployment of a concealed object detection system that is suitable for imaging systems utilizing various forms of energy including millimeter waves, radio waves, visible light, infrared, ultraviolet, microwave energy.

Another need exists in the art for a system for deployment of a millimeter wave concealed object detection system that has the ability to implement multiple lanes of threat inspection in the same structure for increased throughput.

However, in view of the prior art at the time the present invention was made, it was not obvious to those of ordinary skill in the pertinent art how the identified needs could be fulfilled.

IV. SUMMARY

In a particular embodiment, a system for deployment of a millimeter wave concealed object detection system using an outdoor passively illuminated structure is disclosed. The structure includes at least one side wall with at least one louvered panel within the sidewall. The louvered panel is orientated to reflect energy into the structure that is used in part by a concealed object detection system for detecting concealed objects. The louvered panel includes a plurality of adjustable parallel slats for obtaining an optimum deployment angle. The structure further includes at least one detection lane for guiding a subject through the structure and is configured between a controlled entry barrier and an exit barrier of the structure. The system utilizes pre-engineered and pre-manufactured components to effectively control the deployment surroundings and provide a known and successful environment in which the millimeter wave equipment can operate.

One particular advantage provided by embodiments of the system for deployment of a millimeter wave concealed object detection system using an outdoor passively illuminated structure is that the components, techniques, designs and construction separately, or in combination, provide an advantageous, predictable, controlled and managed environment within which the concealed object detection system operates optimally. Another advantage provided by embodiments of the system is that the need to adapt the system's cameras to an uncontrolled environment is eliminated and the system can eliminate the need to custom engineer a deployment for each application. In addition, the system can simplify training and ease of use owing to the fact that each deployment is the same as (or very similar to) another. This would not be the case for a customized/unique deployment for each concealed object detection installation.

Another particular advantage provided by embodiments of the system for deployment of a millimeter wave concealed object detection system using an outdoor passively illuminated structure is that the system eliminates the need for the parent structure or area to be modified, expanded or re-engineered in order to accommodate the concealed object detection system equipment and logistics.

Another advantage provided by embodiments of the system is that the system can reduce the risk to the parent structure by containing the threat detection process and perhaps explosive blasts within an external building designed with blast mitigation techniques. The system can simplify the repair or replacement of a damaged deployment should it become necessary (e.g., due to an explosives detonation). The system can provide a stable, standard platform for deployments across extremely variable environments, resulting in lower installation costs and time, and simpler construction and support due to the standardized methodology. Further, the system allows for a realization of manufacturing, engineering and procurement cost savings due to economies of scale.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

Figure 2:
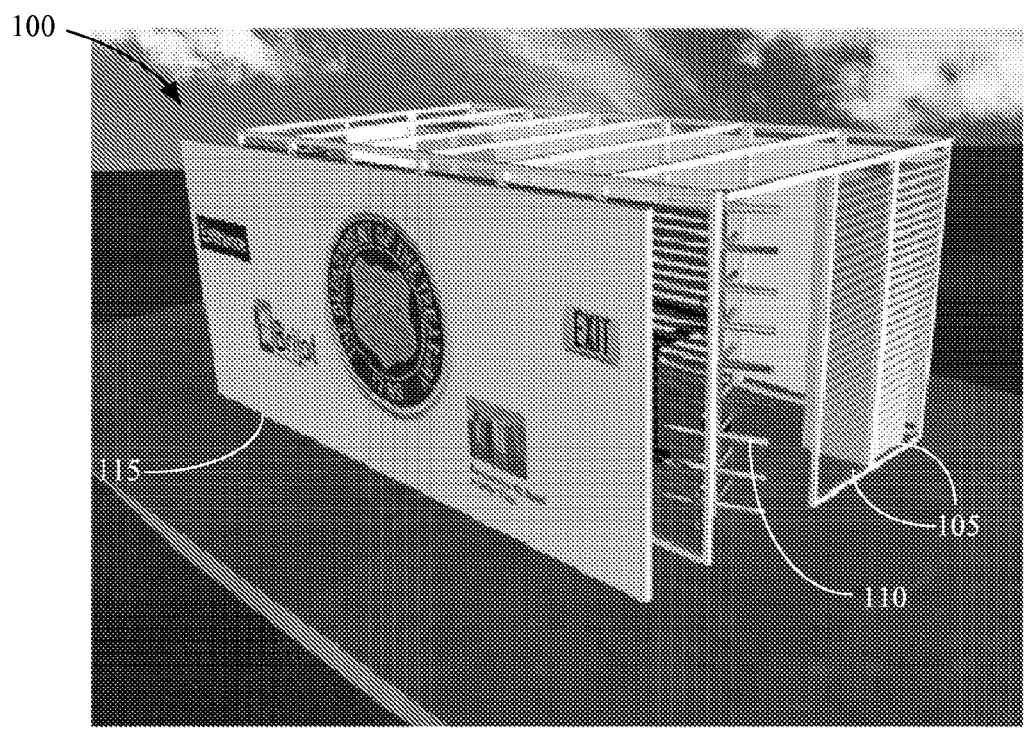
Figure 3:
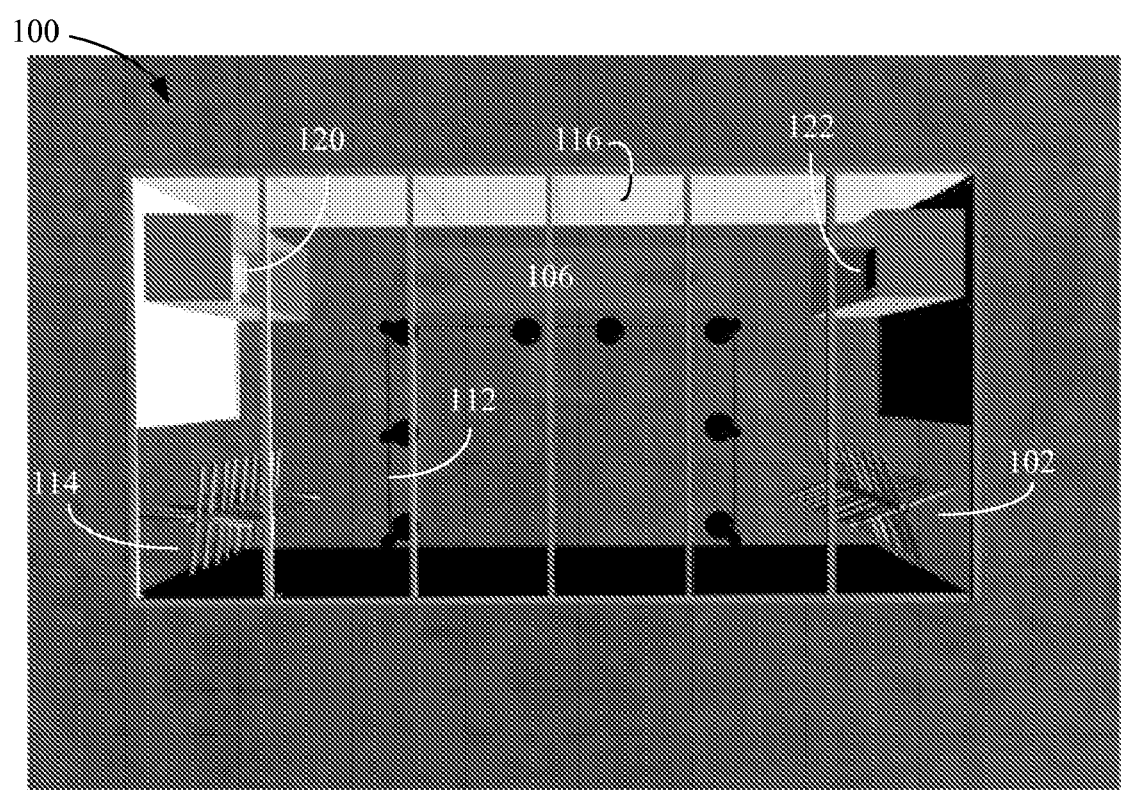

FIG. 1 is an exit perspective view of a particular illustrative first embodiment of a system for deployment of a millimeter wave concealed object detection system using an outdoor passively illuminated structure with a top panel removed from the structure for clarity;

FIG. 2 is an exit perspective view of a particular illustrative first embodiment of a system for deployment of a millimeter wave concealed object detection system using an outdoor passively illuminated structure having a blast wall in front of a side panel and with the top panel removed from the structure for clarity; and FIG. 3 is a top view of a particular illustrative first embodiment of a system for deployment of a millimeter wave concealed object detection system using an outdoor passively illuminated structure with the top panel removed from the structure for clarity.

VI. DETAILED DESCRIPTION

A system for deployment of a millimeter wave concealed object detection system using an outdoor passively illuminated structure is disclosed. The system provides effective control of deployment surroundings and provides a known and successful environment in which the millimeter wave equipment can operate. Several components, techniques, technologies and methodologies including, external millimeter wave energy mitigation, peripheral motion or clutter mitigation, test subject isolation, motion and flow control, threat containment, weather protection, decorative presentation, blast mitigation, and others may each be used separately, or in combination, with the system.

The system may employ a passively outdoor millimeter wave illuminator panel as described in U.S. Patent Application No. 60/917,414 filed May 11, 2007, the entire disclosure of which is incorporated herein by reference. In addition, the system may include complementary security technology or products including metal detectors, pan-tilt-zoom cameras, x-ray machines, radiological sensors, biometric sensors, iris scanners, palm scanners, finger print scanners, ID readers, etc.

The system includes engineered solutions for a structure having a louvered wall construction, flooring, lighting, ambient millimeter wave energy mitigation, flow/traffic control, decorative presentation, threat containment, blast mitigation, and reduction of peripheral visual/millimeter wave clutter. The system allows for configurations with either a single detection lane of access or multiple detection lanes of access. The detection lanes may be equipped with either a common or a dedicated entry barrier and exit barrier, which may be controlled (magnetic locking door, controlled turnstile, etc) or uncontrolled (isolation curtain, manual door). The system allows for one or more concealed object detection cameras per detection lane. The system may include provisions for complementary products including, but not limited to, x-ray machines, iris scanners, biometrics, finger/palm readers, metal detectors, and access cards. The disclosed system may include an area within the structure to host internal security personnel, or may include an internal intercom system allowing external security personnel to remotely communicate with subjects inside the structure while viewing the subject via internal camera and/or ancillary cameras or devices, thus providing "stand-off" protection from explosive detonations.

A particular illustrative embodiment of a system for deployment of a millimeter wave concealed object detection system using an outdoor passively illuminated structure is disclosed and illustrated in FIGS. 1-3. The preferred embodiment of the disclosed system is based on a modified and customized storage structure generally designated 100 with an optional full body turnstile entry barrier 102 and an optional exit barrier 110 located at the ends of the structure 100.

The structure 100 includes optional separate entry and exit barriers 102, 110, and having at least one concealed object or weapons detection system that may be positioned in series with the legacy entry or exit of a parent structure (not shown) or area such that instead of directly entering or exiting the parent structure via the legacy entrance/exit, entrance or exit must be effected by first traversing the detection structure 100.

The system is configured to exploit the nature of the open cold sky to provide a supply of millimeter wave energy. Accordingly, the side walls of the structure 100 may be comprised of one or more louvered panels 105. Each panel 105 can be constructed of varying materials in varying dimensions, weights, sizes and shapes. In the preferred embodiment, the louvered component of the panels 105 is constructed of a millimeter wave reflecting material such as most metals. In addition, the open-air louvered wall architecture of the structure 100 provides intrinsic explosive blast mitigation. In another illustrative embodiment, a blast wall 115 is constructed out side of the structure 100 and in front of the louvered panels 105. The blast wall 115 provides additional blast mitigation and increased security benefits.

The horizontal louvers comprising the face of the panel are angled at an optimal angle to reflect the relatively cold millimeter wave energy of the open sky into the structure for use in the concealed object detection system. For typical applications, the optimal angle is approximately 18 degrees, however this will change depending on the requirements of the environment and application. The louvers can be made to be adjustable in length, width or angle similar to a Venetian blind. In another illustrative embodiment, the louvers can be made to have a fixed angle, and the entire panel can be designed and constructed to have a freedom of tilt for obtaining the optimum deployment angle depending on the installation site.

In operation, the subject enters the structure 100 through an optional controlled access entry barrier 102 such as a magnetic-locking door or full body turnstile. Upon entry, the controlled access entry 102 and optional exit barrier 110 lock, securing the subject in the structure 100. An inspection lane 106 guides a subject through the structure 100 while being monitored by the system's single or multiple weapons/object detection camera(s) 120, 122. A partition 112 (e.g., a wall, stanchions, etc.) optionally divides the structure 100 to form the detection area and inspection lane 106. The entry barrier 102 and exit barrier 110 can be offset from the inspection lane 106 so that in the event of an explosion, the blast is substantially contained within the structure 100. A monitoring area may be provided inside or outside the structure 100 to host security personnel and may include an internal intercom system allowing the security personnel to remotely communicate with subjects inside the structure 100 while viewing the subject via the weapons/object detection system's internal camera and/or ancillary cameras or devices, thus providing "stand-off" protection from explosive detonations.

For single weapons/object detection camera deployments, the subject may be commanded to stop and turn in front of the weapons/object detection camera before continuing. For multiple weapons/object detection camera deployments, the subject either continues undisturbed past the weapons/object detection cameras at a normal walking pace, or is required to stop and stand in front of the weapons/object detection cameras 120, 122 before continuing. If a threat is not detected by the system's weapons/object detection camera(s) 120, 122, the subject exits the structure 100 through the optional controlled exit barrier 110, which will unlock and allow the subject to exit the structure 100. If complementary biometrics products are installed, the optional exit barrier 110 will remain locked until the subject successfully passes the biometrics criteria. If a concealed object is detected by the concealed object detection camera(s), or if the subject does not pass the optional biometric criteria, the optional controlled entry 102 and exit barriers 110 will lock, if not already locked, preventing the subject from exiting the structure 100.

When used as an entry portal to a parent structure or area, upon successfully exiting the structure 100, the subject is then mandated via the design of the system or via external components such as walls, fences, barricades, etc., to enter the parent structure or area. When used as an exit portal to a parent structure or area, the subject is mandated via the design of the system or via external components to exit the parent structure or area and enter through the entry barrier 102 of the structure 100.

The parent structure benefits from concealed object detection, and perhaps other security measures, conducted in a controlled, secured location directly outside of the parent structure, without requiring the parent structure or area to be placed at risk, modified, expanded or otherwise affected to incorporate the required security changes, equipment and logistics internally.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A system for deployment of a millimeter wave concealed object detection system using an outdoor passively illuminated structure, the system comprising:
    a structure having at least one sidewall;
    at least one louvered panel disposed within the at least one sidewall, wherein the at least one louvered panel orientated to reflect millimeter wave energy into the structure;
    an optional entry barrier disposed at a first end of the structure;
    an optional exit barrier disposed at a second end of the structure;
    at least one detection lane configured within the structure and between the optional entry barrier and optional exit barrier; and
    a concealed object detection system that detects concealed objects passing through the at least one detection lane.

2. The system of claim 1, wherein the detection lane is spatially offset from the optional entry barrier and optional exit barrier so that in the event of an explosion that a blast is substantially contained within the structure.

3. The system of claim 1, wherein the structure is a modified International Organization for Standardization (ISO) container.

4. The system of claim 1, wherein the optional entry barrier and optional exit barrier each further comprising a lockable full body turnstile.

5. The system of claim 1, wherein the optional entry barrier and the optional exit barrier each further comprising magnetic locking doors.

6. The system of claim 1, further comprising a complementary biometric device that is adjacent to the detection lane and used to identify subjects traversing the invention.

7. The system of claim 1, wherein the at least one louvered panel having a plurality of user-adjustable parallel slats to optimize reflecting millimeter wave energy into the structure.

8. The system of claim 1, further comprising fencing or other barrier erected outside of the structure to segregate persons having passed through the detection lane and cleared of dangerous concealed objects from unscreened persons.

9. The system of claim 1, wherein the optional exit barrier is connected to an entryway of a parent structure.

10. The system of claim 1, wherein the optional entry barrier is connected to an exit of a parent structure.

11. The system of claim 1, wherein the at least one louvered panel having a plurality of parallel slats angled at approximately 18 degrees.

12. The system of claim 11, further comprising a separate monitoring area internal or external to the structure to host security personnel.

13. The system of claim 12, wherein the concealed object detection system is a millimeter wave concealed object detection system having at least one millimeter wave camera.

14. The system of claim 1, further comprising an accessory scanning area that is adjacent to the detection lane and used to detect concealed objects hidden in accessories.

15. The system of claim 14, further comprising a blast wall external to the structure and in front of each louvered panel disposed within the at least one sidewall.

16. The system of claim 14, wherein the at least one louvered panel is adjustable for obtaining the optimum deployment angle.

17. The system of claim 16, wherein the at least one louvered panel further comprising millimeter wave reflecting material.

18. A system for deployment of a millimeter wave concealed object detection system using an outdoor passively illuminated structure, the system comprising:
- a structure modified as a security check point wherein the structure is divided into at least two separate detection lanes;
- at least one optional entry barrier disposed at a first end of the structure;
- at least one optional exit barrier disposed at a second end of the structure;
- a divider wall having blast mitigation properties disposed between each detection lane; and
- a concealed object detection system that detects concealed objects passing through the structure;
- wherein the structure further comprising at least one sidewall having at least one louvered panel disposed within the at least one sidewall, wherein the at least one louvered panel orientated to reflect millimeter wave energy into the structure.

19. A system for deployment of a millimeter wave concealed object detection system using an outdoor passively illuminated structure, the system comprising:
- a structure having at least one wall;
- at least one louvered panel disposed within the at least one wall, wherein the at least one louvered panel orientated to reflect millimeter wave energy into the structure;
- at least one detection lane configured within the structure; and
- a concealed object detection system that detects concealed objects passing through the at least one detection lane.

* * * * *